D. & J. Pfouts,
Animal Poke.
N°. 36,363.  Patented Sep. 2, 1862.
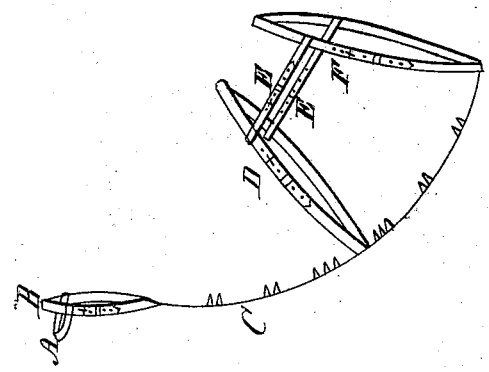
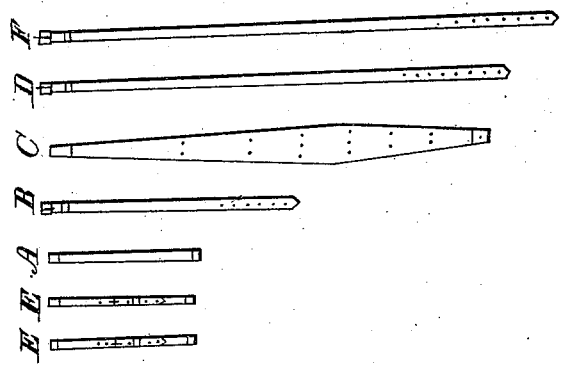
Witnesses.
Gideon Booher
Jane Booher
Inventors.
David Pfouts
John Pfouts

UNITED STATES PATENT OFFICE.

DAVID PFOUTS AND JOHN PFOUTS, OF HOLMES COUNTY, OHIO.

IMPROVED PRICKING-MARTINGALE FOR PREVENTING HORSES OR MULES FROM THROWING OR BREAKING FENCES.

Specification forming part of Letters Patent No. 36,363, dated September 2, 1862.

*To all whom it may concern:*

Be it known that we, DAVID PFOUTS and JOHN PFOUTS, of Holmes county, in the State of Ohio, have invented a new and Improved Mode of Preventing Horses and Mules from Throwing or Breaking Fences; and we do hereby declare that the following is a full and exact description thereof, reference being had to the accompanying drawing, and to the letters of reference marked thereon.

The nature of this invention is to keep horses or mules from throwing or breaking down even the lightest or weakest fences by the use of what we call the "pricking-martingale," which, when properly adjusted and put on to suit the size of the horse or mule, will neither interfere with nor encumber it in walking, pasturing, lying down, getting up, nor in any other way, only when it presents its breast to a fence will prevent it, as before stated, from using sufficient force to throw or break down even weak or light fences. Said martingale is provided with a pricking "breast-strap," as represented in the accompanying drawing by letter C. It extends from the girth to the throat-latch, with a sliding buckle at the lower end to be suited to the size of the animal. The width in the middle of the breast may be from four to six inches and tapered at the upper and lower ends, and be made of leather or other material, supplied with from eight to fifteen sharp nails from one-quarter to one-half inch in length, fastened between two straps made of leather or other substantial material to keep the nails stationary with the points toward the animal's breast. This pricking-strap is held in its position by the other martingale fixtures, as represented in the drawing by the letter *a*, brow-band B, throat-latch D, belt or shoulder-strap E E, and two small straps to keep the belt or shoulder-strap to F, the girth.

What we claim as our invention, and desire to secure by Letters Patent in said pricking-martingale, is—

The combination of said pricking breast-strap and the straps E E, which hold the pricking breast-strap to its place.

DAVID PFOUTS.
JOHN PFOUTS.

Witnesses:
JOHN GEHRING,
G. GERBER.